United States Patent [19]

Onodera et al.

[11] Patent Number: 4,883,671

[45] Date of Patent: Nov. 28, 1989

[54] MANUFACTURING MACHINE FOR SAGGED SELF-SUPPORTING CABLE

[75] Inventors: Fumio Onodera; Hiroshi Uchimi; Toshio Koseki, all of Miyagi, Japan

[73] Assignee: Kitanihon Electric Wire Co., Ltd., Sendai, Japan

[21] Appl. No.: 147,201

[22] Filed: Jan. 22, 1988

[30] Foreign Application Priority Data

Jul. 31, 1987 [JP] Japan ................................. 62-190217

[51] Int. Cl.$^4$ ................................................ H02G 7/06
[52] U.S. Cl. .................................. 425/122; 425/129.1; 425/576; 425/574; 425/588; 425/589; 174/41
[58] Field of Search ............... 425/574, 575, 576, 588, 425/589, 595, 122, 129.1; 174/41; 156/433

[56] References Cited

U.S. PATENT DOCUMENTS

| | | | |
|---|---|---|---|
| 3,624,672 | 11/1971 | Spivy | 425/576 X |
| 3,918,864 | 11/1975 | Braun | 425/576 X |
| 4,133,622 | 1/1979 | Braun | 425/576 X |
| 4,210,196 | 7/1980 | Weiner | 425/589 X |
| 4,662,712 | 5/1987 | Tabata et al. | 174/41 X |
| 4,726,757 | 2/1988 | Berry | 425/576 X |

*Primary Examiner*—Michael W. Ball
*Assistant Examiner*—Jeff H. Aftergut
*Attorney, Agent, or Firm*—Birch, Stewart, Kolasch & Birch

[57] ABSTRACT

A manufacturing machine for sagged self-supporting cable includes a turntable and a drive member for imparting rotation to the turntable. Several die casting members include molds designed to selectively open and close. The die casting member are circumferentially mounted on the turntable. A mold assemblying member is provided for selectively opening and closing the molds. A sag adjusting device is mounted on the turntable for adjusting the position of a main cable so as to be longer between adjacent die cast members than a suspension wire. An injection device is disposed adjacent to a crimping point and moves synchronously with the die casting member for filling the mold cavity with the crimping material for securing the relative positioning of a main cable relative to a suspension wire.

7 Claims, 5 Drawing Sheets

MANUFACTURING MACHINE FOR SAGGED SELF-SUPPORTING CABLE

BACKGROUND OF THE INVENTION

1. Field of the Invention

This invention relates to a manufacturing machine for sagged self-supporting cable wherein a suspension wire and a main cable are connected by crimping material at a given interval.

2. Description of Background Art

An example of a conventional manufacturing machine for sagged self-supporting cable is set forth by the inventor of the present invention and is shown in Japanese Patent No. 61-29811.

The above-mentioned machine consists of a main optical cable supply means, a suspension wire supply means, a linear guide means which feeds the main optical cable and the suspension wire with a spaced distance therebetween. Upper and lower metal molds are provided for crimping the main optical cable and the suspension wire a given distance apart. An injection means fills the molds with crimping material and produces a crimping point. A holding means holds the crimping point and a sag adjusting device provides a sag to the main optical cable. All of the above enable continuous manufacturing of nonmetallic sagged self-supporting cable which has no influence at all with respect to electromagnetic induction.

However, the prior manufacturing machine for sagged self-supporting cable as described above, features an upper mold and an lower one which move up and down at a specific position for opening and closing of the molds which produce a crimping point for the main optical cable and the suspension wire and requires a certain period of time for the molds opening and closing. In other words, the time for the filled crimping material to be solidified to some extent and because the work for the other operations cannot be performed during this time, there has been a problem even if the metal molds include an active cooling means like a water cooled jacket or an air cooled one. Thus, the low productivity has made mass production of the sagged self-supporting cable difficult.

SUMMARY AND OBJECTS OF THE INVENTION

In view of the problem regarding the prior art, an object of this invention is to solve the problem by installing several die cast means including metal molds and the mold assembling means on the turntable.

In order to achieve the above-mentioned object, this invention features an openable metal mold which can crimp continuously supplied suspension wire and main cable at suitable intervals and have the mold cavity shaped like a sword guard around the suspension wire and the main cable at the crimping position. A mold assembling means is provided to open and close this mold. A turntable is provided on which several die cast means including mold assembling means and metal molds are circumferentially installed and which are rotated by a driving mechanism. A sag adjusting device is installed on the turntable and makes the main cable longer between the adjacent die cast means than the suspension wire. An injection means produces the crimping point by moving synchronously with the die cast means and filling the mold cavity with the crimping material.

The present invention efficiently manufactures sagged self-supporting cable by installing circumferentially on the rotating table die cast means consisting of the metal molds and the mold assembling means. Crimping of the suspension wire and the main cable at suitable intervals enables the main cable to be longer between the adjacent die cast means than the suspension wire by the sag adjusting device. Periodically, the several metal molds are filled with the crimping material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
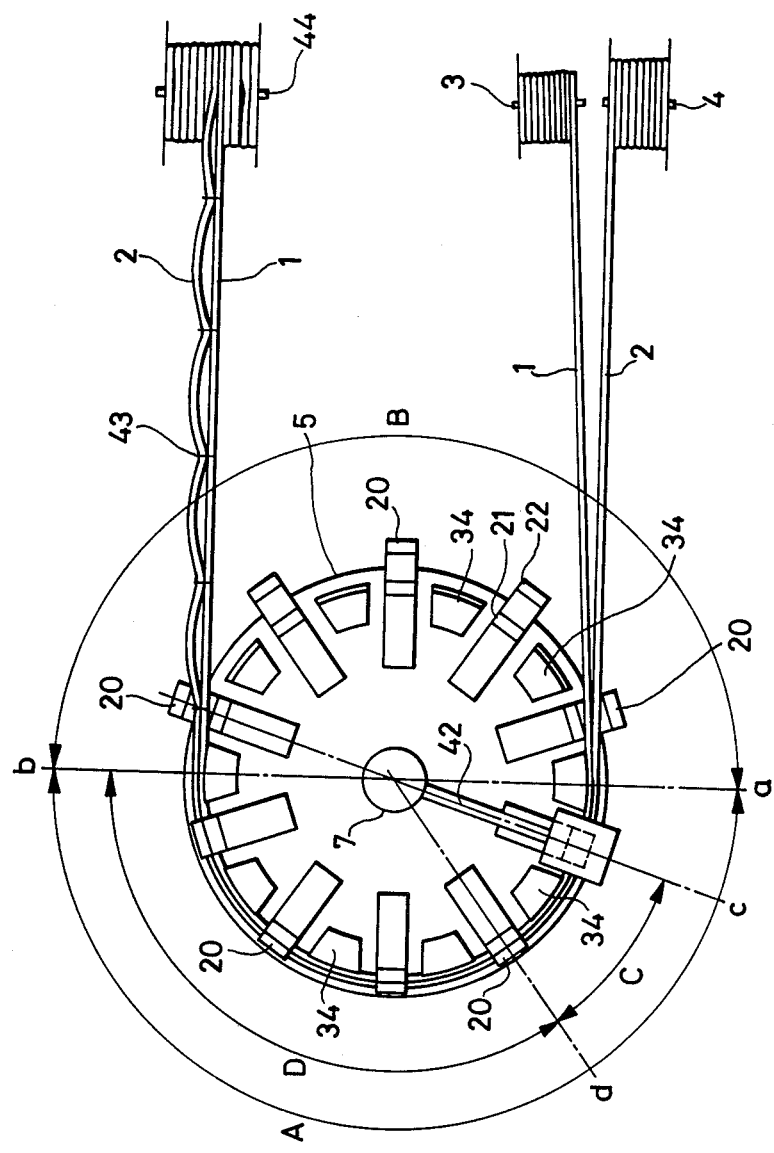
FIG. 1 is a plan view showing an embodiment of the present invention.

A suspension wire is made of FRP rod or Kebler (TM-Dupon), for example, which has a high Young's modulus. A main cable 2 is made of an optical cable. A suspension wire supply means 3 and a main cable supply means 4 are operatively provided adjacent to each other.

A turntable 5 is supported with free rotational movement through bearings 6, 6 by a main shaft 7. The main shaft 7 is also supported through bearings 10, 10 with free rotational movement by a holder 9 fixed onto a base 8.

Figure 9:
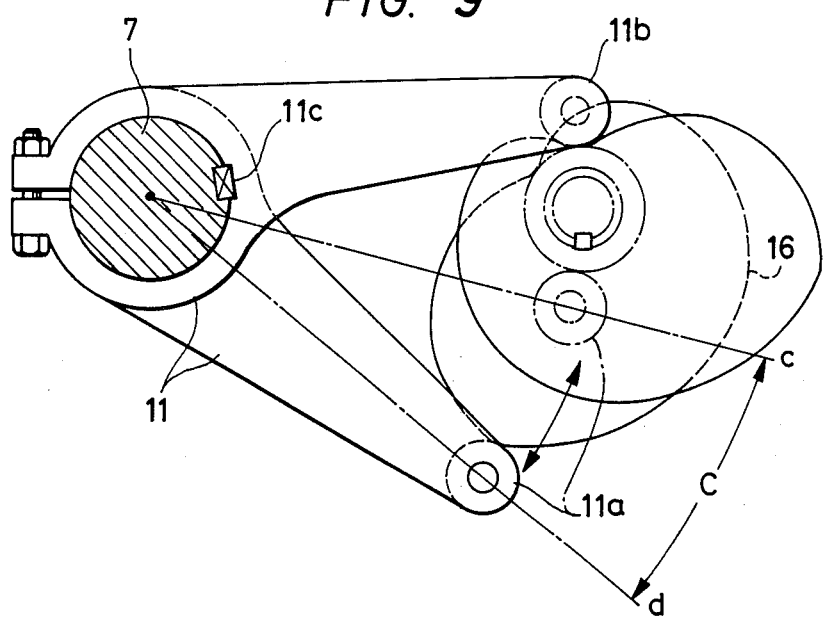
FIG. 9 is a cross-sectional view taken along line IX—IX of FIG. 3.

As shown in FIG. 9, a rotating arm 11 consisting of two arms which are located with a given angular difference and form a "V" shape retain rollers 11a and 11b at the tip of each arm with free rotational movement. The two arms 11 are fixed onto the main shaft 7 by a key 11c so as to rotate coincident therewith.

A driving mechanism 12 is fixed onto the base 8 and is composed of a decelerator 13 driven by, for example, an electrical motor, not illustrated.

Drive gear 15 and two cams 16, 16 are fitted to the output shaft of the decelerator 13. The drive gear 15 mates with driven gear 17 which is fixed to the lower side of turntable 5 and two cams 16, 16 independently contact with the rollers 11a and 11b.

When the output shaft of the drive mechanism rotates the rotational movement of the drive gear 15 is transferred to the driven gears 17 and the turntable 5 rotates at a constant speed. On the other hand, the rotational movement of the two cams 16, 16 is transferred to the main shaft 7 through two rollers 11a, 11b and the rotating arm 11. Thus, the main shaft 7 continues to oscillate with a certain angular movement.

Figure 3:
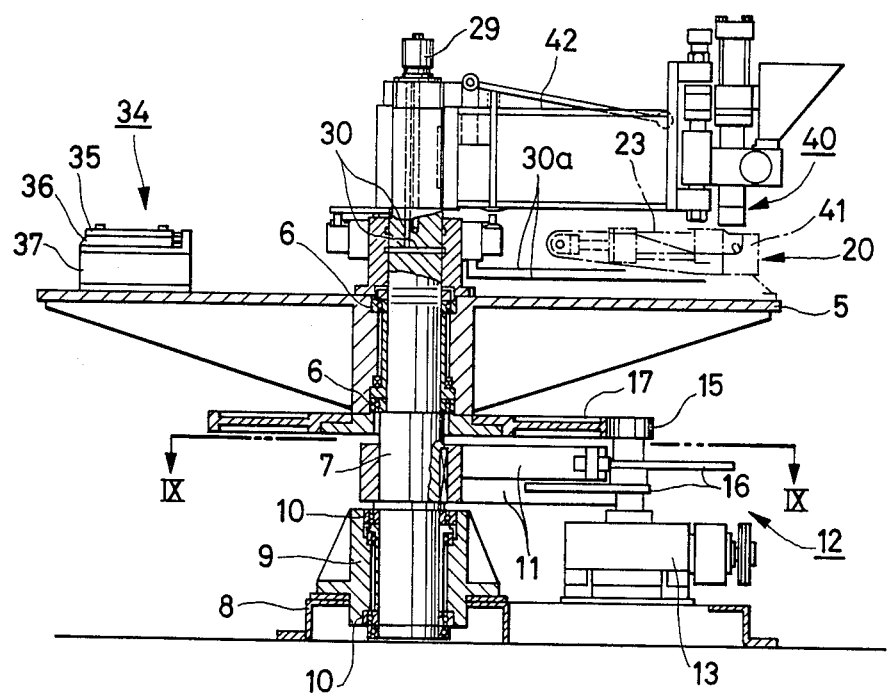
FIG. 3 is a vertical cross-sectional view.
Figure 4:
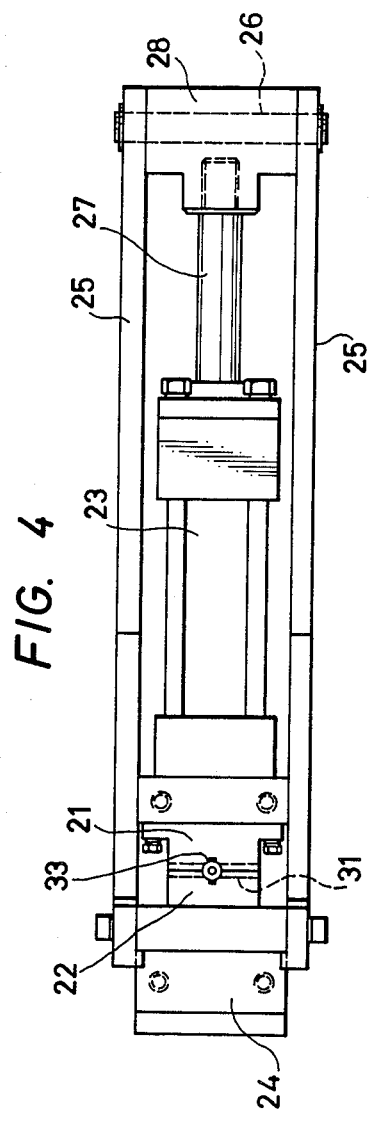
FIG. 4 is a plan view showing the die cast means.

A die cast member 20 is installed onto the turntable 5. As shown in FIGS. 1 and 3, in this embodiment, ten die cast members 20 are installed circumferentially with the same angular spacing. As shown in the enlarged views of FIGS. 4 and 5, the die cast members 20 include a couple of metal molds 21, 22 with a single rod type hydraulic cylinder 23 which may be used as an example for a mold assemblying means to open and close the metal molds 21, 22. An attachment bracket 24 is provided for affixing the members onto the turntable 5.

The stationary metal mold 21 and an end of the hydraulic cylinder 23 are fixed to the attachment bracket 24 and the movable metal mold 22 is fixed to one end of the actuating arm 25. The other end of the actuating arm 25 is connected, with free rotational movement, by pin 26 to the block 28 which is located at an end of the piston rod 27 of the hydraulic cylinder 23.

Figure 5:
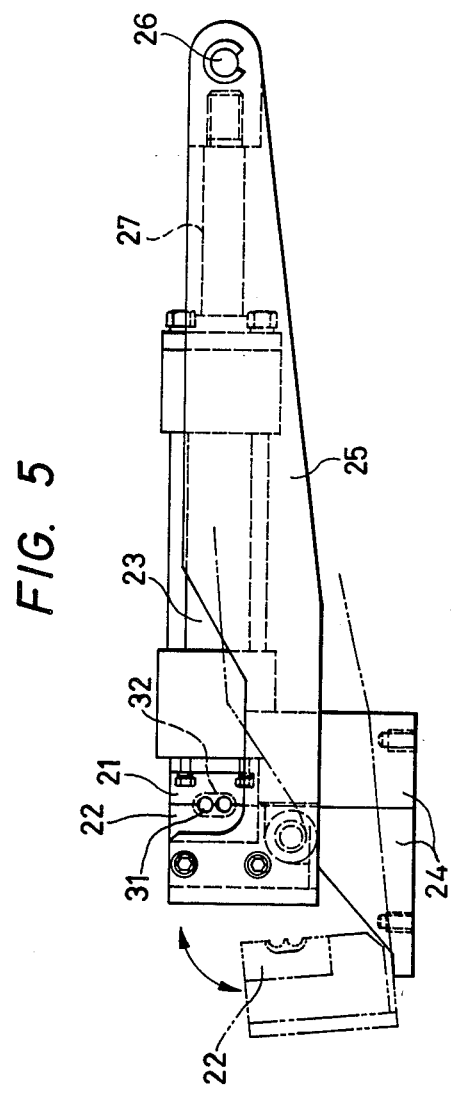
FIG. 5 is a front view of the die cast means.

In the extended condition of the piston rod 27, as shown in FIG. 5, two metal molds 21 and 22 contact with each other. In the retracted condition the movable metal mold 22 affixed to the actuating arm 25 moves to the position shown by double dotted line in FIG. 5 and opens the two molds 21 and 22.

As illustrated in FIG. 3, a rotary joint 29 is connected through a hose like member to the hydraulic pressure system not shown in FIG. 3. The rotary joint 29 is also connected through the passage 30 running axially inside the main shaft 7. Piping 30a and a fluid direction changing valve connects the hydraulic pressure system to the hydraulic cylinder 23.

Figure 6:
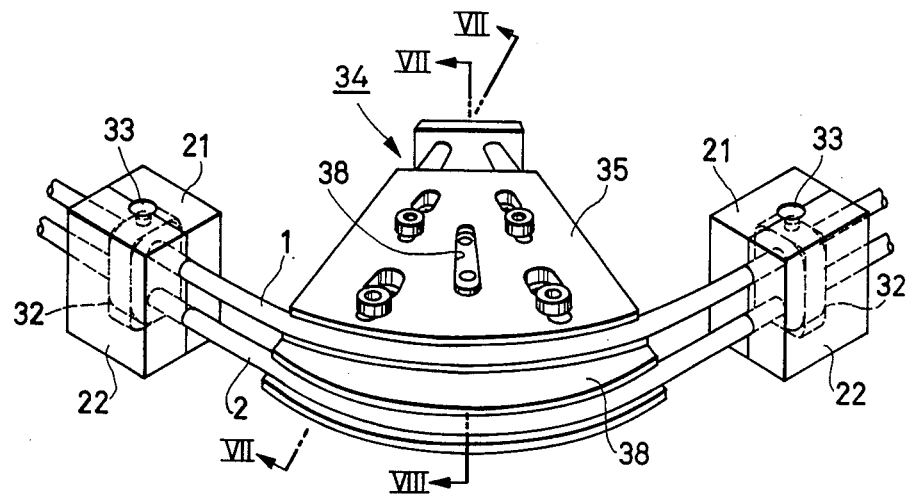
FIG. 6 is an angled view showing the sag adjusting mechanism.
Figure 7:
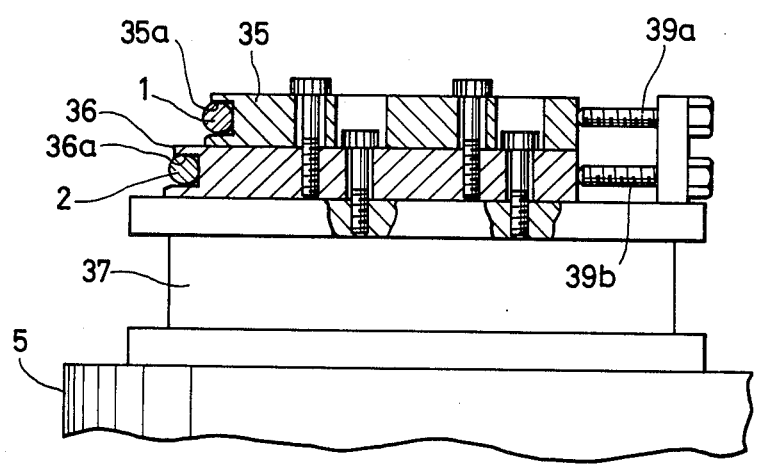
FIG. 7 is a cross-sectional view taken along line VII—VII of FIG. 6.
Figure 8:
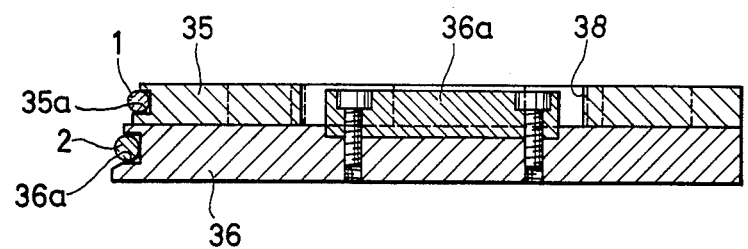
FIG. 8 is a cross-sectional view taken along line VIII—VIII of FIG. 6.

The metal molds 21 and 22 have two through crimping holes which are situated with a suitable distance therebetween in the direction of the contact surfaces so as to crimp the continuously supplied suspension wire and main cable at a suitable interval. A sword-guard shaped continuous mold cavity 32 is provided in the middle of the contact surface of the metal molds 21 and 22 around the suspension wire and the main cable. An inlet hole 33 is situated on the upper surface of the metal molds 21 and 22 and includes a bottom end which is in communication with the mold cavity 32. A sag adjusting device 34 is situated between the adjacent die cast means 20, 20. Each sag adjusting device 34 has, as shown in Figures 6 and 7, a plate 35 for the suspension wire and plate 36 for the main cable, both shaped in semicircular arcs. A support 37 is provided on which both plates 35 and 36 are fixed.

Both plates 35 and 36 are installed onto the turntable 5 through the support 37. Guide grooves 35a and 36a are provided along the semicircular surfaces of the plates 35 and 36 to guide the suspension wire and the main cable, respectively.

Furthermore, on the upper side plate 35 for the suspension wire there is provided an elongated hole extending radially relative to the turntable 5. A guide key 36b is affixed to the plate 36 for the main cable slides and is positioned inside the elongated hole. This mechanism enables a relative movement of both plates 35 and 36 in the radial direction relative to the turntable 5. Adjusting bolts 39a and 39b are provided for adjusting the extrusion level of each plate 35 and 36.

Figure 2:
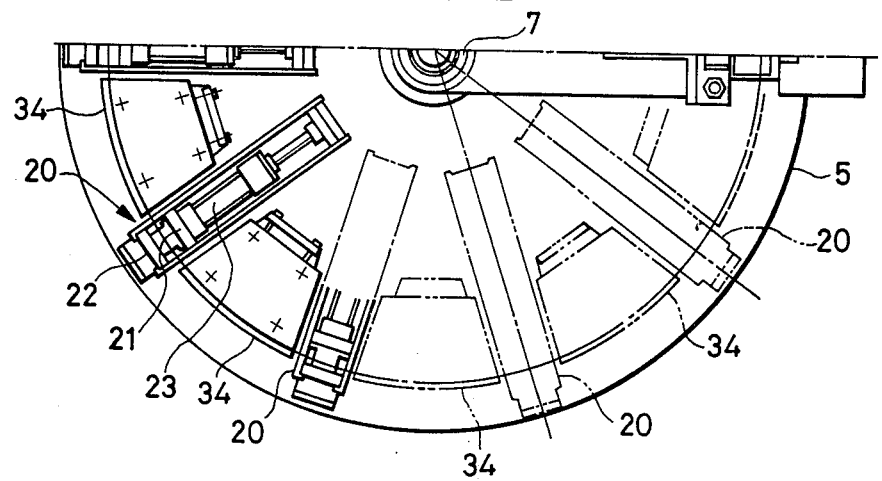
FIG. 2 is a plan view showing a lower half of the turntable.

FIGS. 1 to 3 illustrate an injection means 40 for filing the mold cavity 32 generated by the metal molds 21 and 22 with crimping material. The head arm 42 supports the injection means 40. A root end of the head arm is fixed to the top of the main shaft 7 and rotates with the main shaft. Thus, the head arm 42 makes the same oscillating movement as the rotating arm 11.

The head arm 42, therefore, rotates synchronously with the turntable 5 in the angular region C shown in FIG. 9 which corresponds to the angular difference between the adjacent die cast means. During the time of rotation, the injecting means 40 fills the mold cavity 32 with the melted crimping material. The suspension wire 1 and the main cable 2 are crimped together at given intervals by a sword guard shaped crimp 43 which is solidified crimping material as mentioned above.

In the rotational region of the turntable 5, the region A from point a to point b corresponds to the period during which the metal molds 21 and 22 are in contact and the remaining region B from point b to point a corresponds to the period during which both molds are open.

The region C from point c, which is spaced apart from point a to point d, corresponds to the injection period of the injection means 40. The region D from point d to point b corresponds to the filling period of the crimping material, respectively.

In this embodiment, A=B=180 degree is assumed. As illustrated in FIG. 1, a winding means 44 is provided for winding up the sagged self-supporting cable. The following is an explanation of the operation of this embodiment.

First, the suspension wire 1 and the main cable 2 are pulled out from the supply means, respectively, at the position of point a with the tips to be engaged in the crimping holes 31 of the metal molds 21 and 22 in the die cast means which is situated in front of the injection means 40.

In this state, the operation of the driving mechanism 12 transfers rotational movement of the electric motor to the driving gear 17 and the rotational arm 11 through the drive gear 15 and the two cams 16, 16 begin to rotate the turntable 5 in the clockwise direction as illustrated in FIG. 1. The rotation is at a given constant speed and the injection means 40 oscillates in the angular region C.

When the first die cast means 20 grasps the suspension wire 1 and the main cable 2 reaches point c, the nozzle 41 of the injection means 40 synchronously moving with the turntable 5 is moved downwardly and fits into the inlet hole 33. Wherein injection of the crimping material begins and continues to point d. Completing the injection of the crimping material at point d, the injection means 40 is moved up and separates the nozzle 41 from the metal molds 21 and 22 and returns to the original position, point c.

When the first die cast means 20 arrives at point d, the second die cast means 20 reaches point c and, as mentioned above, is engaged by the injection means 40 and the crimping material is injected into the mold cavity 32 through the nozzle 41 and the inlet hole 33.

The injection means 40 repeats the injection forming. In this operation, the length of the main cable 2 is set to be longer between the adjacent die cast means 20, 20 by the function of the sag adjusting device 34 as compared to the length of the suspension wire 1.

Figure 10:
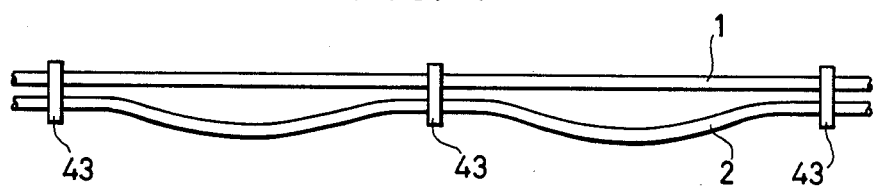
FIG. 10 is a front view showing the sagged self-supporting cable.

The crimping material injected into the mold cavity 32 is cooled down completely during the movement through the region D and forms the solid sword guide shaped crimp 43. Then, at point b where the metal molds 21 and 22 are open, the sagged self-supporting cable which has crimp 43 and provides sag to the main cable 2 as shown in FIG. 10 are continuously obtained.

According to the preferred embodiment, ten die cast means 20 are utilized with a line speed six times as fast as that of a conventional manufacturing machine. Furthermore, if the number of the die cast means 20 is increased with respect to the above-mentioned embodiment, several injection means 40 may be installed to further increase line speed.

In the sag adjusting device 34 relevant to this embodiment, the sag amount of the main cable 2 can be arbitrarily adjusted by changing the relative extrusion amount between the plate 35 for the suspension wire and the plate 36 for the cable. Hence, a simpler construction is provided as compared to a conventional device.

The sag adjustment can be done easily and also accurately. In the above-mentioned embodiment, the non-metallic type optical cable is used as an aerial cable. This invention shall not be limited to this embodiment and can be also applied to metallic cable.

In accordance with this invention, as illustrated above, the effect can be obtained wherein the machine is of simple construction and can manufacture the sagged self-supporting cable at high line speed. This results in the great improvement of the manufacturing efficiency which can be introduced by installing several die cast means composing the metal molds and the mold assemblying means onto the turntable. Thus, sag adjusting of the main cable by the sag adjusting device and injecting the crimping material by the injection means can be accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing machine for sagged self-supporting cable comprising:
    a turntable;
    drive means for imparting rotation to said turntable;
    several die casting means including molds adapted to selectively open and close to define a mold cavity, said die casting means being circumferentially mounted on said turntable;
    mold assembling means for selectively opening and closing said molds;
    a sag adjusting device mounted on said turntable for adjusting a position of a main cable so as to be longer between adjacent die cast means than a suspension wire, said sag adjusting device includes a first plate and a second plate, said first and second plates being adjustably secured relative to each other and to said turntable for selectively adjusting a spacing between a main cable and a suspension wire; and
    an injection means disposed adjacent to a crimping point and moving synchronously with said die casting means and filling said mold cavity with crimping material for securing a relative positioning of a main cable relative to a suspension wire.

2. A manufacturing machine for sagged self-supporting cable according to claim 1, wherein said sag adjusting device is located on said turntable for radial movement and said second plate displaces the main cable outward in a radial direction from the suspension wire.

3. A manufacturing machine for sagged self-supporting cable according to claim 1, wherein ten die casting means are equally spaced around a circumference of said turntable.

4. A manufacturing machine for sagged self-supporting cable according to claim 3, wherein ten sag adjusting devices are mounted on said turntable, said sag adjusting devices being interposed between adjacent die casting means.

5. A manufacturing machine for sagged self-supporting cable according to claim 1, wherein said mold assembling means includes a hydraulic cylinder operatively controlled for selectively opening a mold prior to a main cable and suspension cable being introduced therein and for selectively closing said mold after a main cable and suspension cable are disposed therein for enabling said injection means to communicate with said mold cavity for crimping a main cable relative to said suspension wire.

6. A manufacturing machine for sagged self-supporting cable according to claim 1, wherein each of said molds includes two crimping holes for accommodating a main cable and a suspension wire in spaced apart relationship.

7. A manufacturing machine for sagged self-supporting cable according to claim 1, wherein said mold assembling means radially and vertically separates said molds for enabling a main cable and a suspension wire to be positioned within said mold prior to actuation of said mold assembling means for repositioning mold portions relative to each other for securing a main cable and a suspension wire relative to each other.

* * * * *